United States Patent
Cordatos et al.

(10) Patent No.: US 11,511,877 B2
(45) Date of Patent: Nov. 29, 2022

(54) INERT GAS SYSTEM AND METHOD

(71) Applicant: Hamilton Sundstrand Corporation, Charlotte, NC (US)

(72) Inventors: Haralambos Cordatos, Colchester, CT (US); Jonathan Rheaume, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 480 days.

(21) Appl. No.: 16/525,553

(22) Filed: Jul. 29, 2019

(65) Prior Publication Data

US 2021/0031938 A1 Feb. 4, 2021

(51) Int. Cl.
*B64D 37/32* (2006.01)
*A62C 3/08* (2006.01)
(Continued)

(52) U.S. Cl.
CPC ............... *B64D 37/32* (2013.01); *A62C 3/08* (2013.01); *B01D 53/228* (2013.01); *B01D 53/229* (2013.01); *B01D 53/04* (2013.01); *B01D 2251/30* (2013.01); *B01D 2251/40* (2013.01); *B01D 2251/602* (2013.01); *B01D 2253/1124* (2013.01); *B01D 2256/10* (2013.01);
(Continued)

(58) Field of Classification Search
CPC .... A62C 3/07; A62C 3/08; A62C 3/10; B01D 53/02; B01D 53/04; B01D 53/228; B01D 53/229; B01D 2251/30; B01D 2251/40; B01D 2251/602; B01D 2259/4575; B01D 2259/4566; B01D 2259/40083; B01D 2257/104; B01D 2257/302; B01D 2257/404; B01D 2253/1124; B01D 2256/10; B01D 2256/12; B64D 37/32
See application file for complete search history.

(56) References Cited

U.S. PATENT DOCUMENTS

| | | | | |
|---|---|---|---|---|
| 4,425,312 A | * | 1/1984 | Brignac | B01D 53/02 423/230 |
| 7,036,489 B1 | * | 5/2006 | Wu | F01N 3/0842 123/519 |

(Continued)

FOREIGN PATENT DOCUMENTS

| | | |
|---|---|---|
| EP | 3117891 A1 | 1/2017 |
| KR | 1020140039359 | 4/2014 |
| WO | 2014080373 A2 | 5/2014 |

OTHER PUBLICATIONS

Extended European Search Report issued in Application No. 19211467.6 dated Oct. 14, 2020, 10 pages.

(Continued)

*Primary Examiner* — Gabriel E Gitman
(74) *Attorney, Agent, or Firm* — Cantor Colburn LLP

(57) ABSTRACT

A system and method for providing inerting gas to a protected space is disclosed. The system includes an air separation module that includes an air inlet, a membrane with a permeability differential between oxygen and nitrogen, a nitrogen-enriched air outlet, and an oxygen-enriched air outlet. The system also includes an air flow path between an air source and the air separation module inlet, and an inerting gas flow path between the air separation module nitrogen-enriched air outlet and the protected space.

16 Claims, 3 Drawing Sheets

(51) Int. Cl.
*B01D 53/22* (2006.01)
*B01D 53/04* (2006.01)

(52) U.S. Cl.
CPC .... *B01D 2256/12* (2013.01); *B01D 2257/104* (2013.01); *B01D 2257/302* (2013.01); *B01D 2257/404* (2013.01); *B01D 2259/40083* (2013.01); *B01D 2259/4566* (2013.01); *B01D 2259/4575* (2013.01)

(56) References Cited

U.S. PATENT DOCUMENTS

| | | | | |
|---|---|---|---|---|
| 7,204,868 | B2* | 4/2007 | Snow, Jr. | A62C 3/06 |
| | | | | 96/4 |
| 9,102,416 | B1 | 8/2015 | Cutler | |
| 10,183,252 | B2 | 1/2019 | Robinson et al. | |
| 2008/0307779 | A1* | 12/2008 | El-Malki | B01D 53/9404 |
| | | | | 60/299 |
| 2009/0246107 | A1* | 10/2009 | England | B01J 20/2803 |
| | | | | 423/230 |
| 2010/0005962 | A1* | 1/2010 | Kames | B01D 53/02 |
| | | | | 95/116 |
| 2014/0208943 | A1 | 7/2014 | Gupta | |
| 2014/0346396 | A1 | 11/2014 | Michalakos et al. | |
| 2016/0220950 | A1* | 8/2016 | Ribarov | B01D 53/22 |
| 2016/0376019 | A1 | 12/2016 | Jensen et al. | |
| 2017/0015433 | A1* | 1/2017 | Thibaud | B01D 53/229 |

OTHER PUBLICATIONS

European Search Report Issued in Application No. 19211467.6 dated Jul. 13, 2020, 11 pages.

James E. Parks II et al., "Lean NOx Trap Catalysis for Lean Natural Gas Engine Applications" Oak Ridge National Laboratory, Sep. 2007, 80 pages.

Philip D. Whitefield et al., "The Development of Exhaust Speciation Profiles for Commercial Jet Engines", UMR, Center of Excellence for Aerospace Particulate Emissions Reduction Research, 2005, 261 pages.

\* cited by examiner

INERT GAS SYSTEM AND METHOD

BACKGROUND

The subject matter disclosed herein generally relates to systems for generating and providing inert gas, oxygen, and/or power such as may be used on vehicles (e.g., aircraft, military vehicles, heavy machinery vehicles, sea craft, ships, submarines, etc.) or stationary applications such as fuel storage facilities.

It is recognized that fuel vapors within fuel tanks can become combustible or explosive in the presence of oxygen. An inerting system decreases the probability of combustion or explosion of flammable materials in a fuel tank by maintaining a chemically non-reactive or inerting gas, such as nitrogen-enriched air, in the fuel tank vapor space, also known as ullage. Three elements are required to initiate combustion or an explosion: an ignition source (e.g., heat), fuel, and oxygen. The oxidation of fuel may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of oxidation of fuel by reducing the oxygen concentration by introducing an inerting gas such as nitrogen-enriched air (NEA) (i.e., oxygen-depleted air or ODA) to the ullage.

BRIEF DESCRIPTION

A system for providing inerting gas to a protected space is disclosed. The system includes an air separation module that includes an air inlet, a membrane with a permeability differential between oxygen and nitrogen, a nitrogen-enriched air outlet, and an oxygen-enriched air outlet. The system also includes an air flow path between an air source and the air separation module inlet, and an inerting gas flow path between the air separation module nitrogen-enriched air outlet and the protected space. The system further includes an adsorber configured to adsorb an acid precursor in operative fluid communication with the air flow path.

Also disclosed is a method of producing inert gas. According to the method, air is directed through an adsorber configured to adsorb an acid precursor to produce treated air, and the treated air is directed through a membrane with a permeability differential between oxygen and nitrogen to produce inert gas comprising nitrogen-enriched air.

In some aspects, the acid precursor can include NOx, and the method can further include oxidizing nitrogen monoxide in the adsorber to facilitate adsorption.

In any one or combination of the foregoing aspects, the method can include regenerating the adsorber by desorbing the acid precursor from the adsorber.

In any one or combination of the foregoing aspects, the method can include directing a fuel to the adsorber during regeneration, and optionally (i) oxidizing the fuel; (ii) reforming the fuel; or (iii) oxidizing and reforming the fuel during regeneration.

In any one or combination of the foregoing aspects, the method can include removing fuel vapor from a fuel tank vent line with a fuel sorbent, and directing fuel vapor from the fuel sorbent to the adsorber during regeneration.

In any one or combination of the foregoing aspects, the air separation module membrane can include an organic polymer membrane.

In some aspects, the polymer membrane can comprise a polyimide, a polysulfone, or a polycarbonate.

In any one or combination of the foregoing aspects, the adsorber can comprise a sorbent selected from salts or oxides of alkaline metals; or salts or oxides of alkaline earth metals.

In any one or combination of the foregoing aspects, the acid precursor can comprise NOx or SOx.

In any one or combination of the foregoing aspects, acid precursor can comprise NOx.

In any one or combination of the foregoing aspects, the adsorber can include a catalyst configured to oxidize nitrogen monoxide during sorption.

In any one or combination of the foregoing aspects, the catalyst can include an oxidation catalyst and a reforming catalyst.

In any one or combination of the foregoing aspects, the system can further include a regenerative fluid flow path in operative fluid communication between a fuel source and the adsorber.

In any one or combination of the foregoing aspects, the adsorber can include a catalyst configured to oxidize fuel, or catalyst to reform fuel, or catalyst to oxidize fuel and catalyst to reform fuel from the regenerative fluid flow path during regeneration of the adsorber.

In any one or combination of the foregoing aspects, the fuel source can include a fuel tank that is also included in the protected space.

In any one or combination of the foregoing aspects, the regenerative fluid flow path can include a flow path from the air separation module nitrogen-enriched air outlet, through the fuel source, to the adsorber.

In any one or combination of the foregoing aspects, the fuel source can include a fuel vapor sorbent in operative fluid communication with a fuel tank.

In any one or combination of the foregoing aspects, the system can further include a controller configured to operate the system in alternate modes of operation including a first mode in which the acid precursor is accumulated in a sorbent in the adsorber, and a second mode in which the accumulated acid precursor is removed from the adsorber.

In any one or combination of the foregoing aspects, the system can be disposed on-board an aircraft.

In any one or combination of the foregoing aspects, the system can further include a particulate filter and a catalytic ozone treatment catalyst on the air flow path.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Although shown and described above and below with respect to an aircraft, embodiments of the present disclosure are applicable to on-board systems for any type of vehicle or for on-site installation in fixed systems. For example, military vehicles, heavy machinery vehicles, sea craft, ships, submarines, etc., may benefit from implementation of embodiments of the present disclosure. For example, aircraft and other vehicles having fire suppression systems, emergency power systems, and other systems that may utilize electrochemical systems as described herein may include the redundant systems described herein. As such, the present disclosure is not limited to application to aircraft, but rather aircraft are illustrated and described as example and explanatory embodiments for implementation of embodiments of the present disclosure.

Figure 1A:
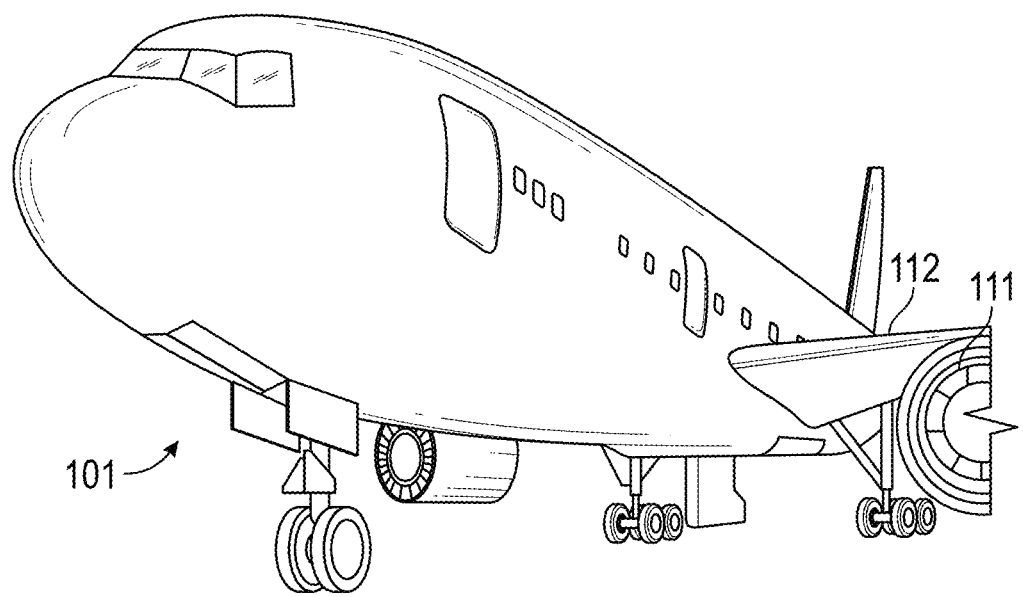
FIG. 1A is a schematic illustration of an aircraft that can incorporate various embodiments of the present disclosure.
Figure 1B:
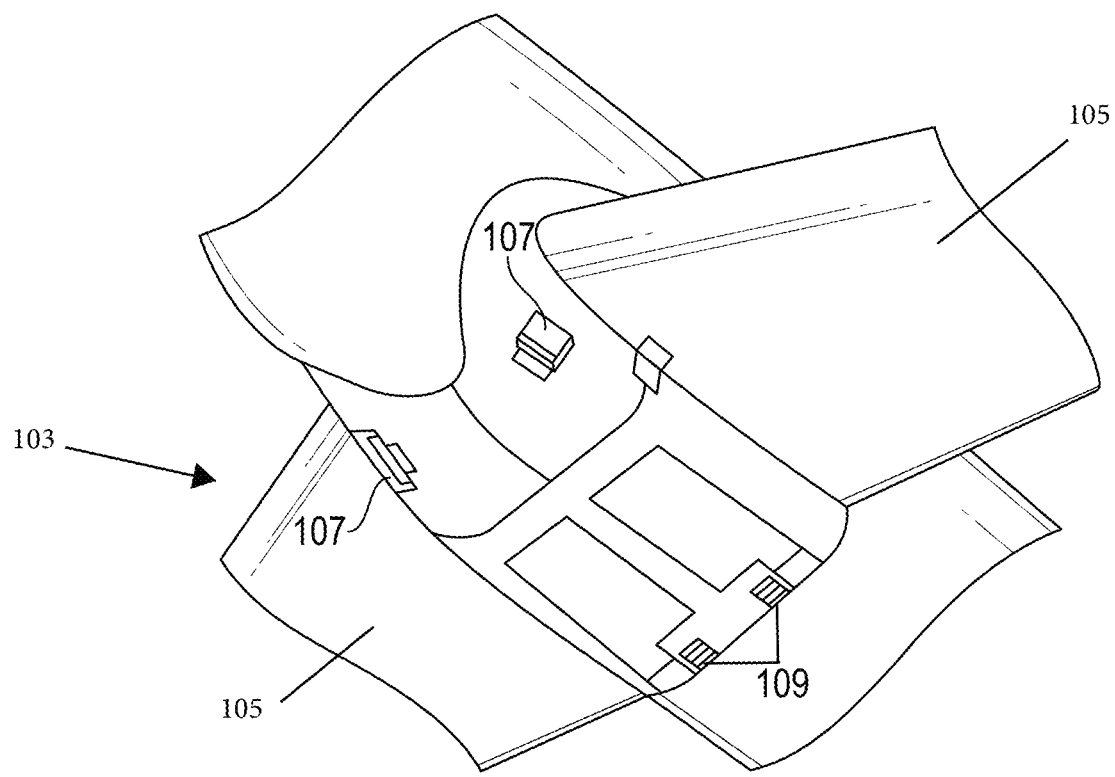
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems (ECS) and/or on-board inerting gas generation systems (OBIGGS) within the bay 103. As shown in FIG. 1B, the bay 103 includes bay doors 105 that enable installation and access to one or more components (e.g., OBIGGS, ECS, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to OBIGGS, ECS, and/or other systems, as will be appreciated by those of skill in the art.

Figure 2:
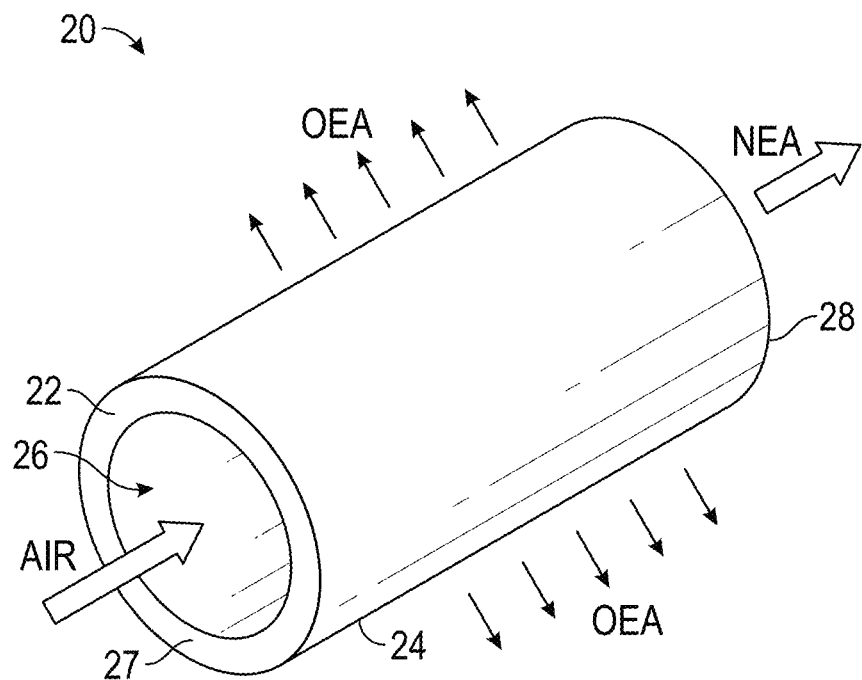
FIG. 2 is a schematic illustration of an exemplary tubular membrane for separating nitrogen and oxygen.

With reference now to FIG. 2, the Figure schematically depicts an exemplary membrane for separating nitrogen and oxygen. FIG. 2 depicts a tubular membrane, but other configurations such as planar membranes can also be used. As shown in FIG. 2, tubular membrane 20 comprises a tubular shell 22. The membrane 20 can be fabricated from a material that has selective permeability to oxygen compared to nitrogen such that a pressure differential across the membrane provided by a gas comprising nitrogen and oxygen on the high-pressure side of the membrane will preferentially diffuse oxygen molecules across the membrane. For ease of illustration, the membrane 20 is depicted as a monolithic hollow shell, and membranes fabricated solely out of the selective oxygen-permeable membrane material are included within the scope of this invention. However, in many cases, the membrane is a composite of a substrate or layer that is permeable to both oxygen and nitrogen and a substrate or layer that is selectively permeable to oxygen.

The shell 22 defines a hollow core 26 that is open at both ends. In use, pressurized gas comprising nitrogen and oxygen (e.g., air which is known to also contain trace amounts of noble/inert gases) is delivered into the hollow core 26 at an inlet end 27 of the membrane 20. The pressure of the air is greater than air outside the core 26 such that a pressure differential between the hollow core 26 and air at the exterior 24 of the membrane 20 exists. Oxygen molecules preferentially diffuse through the tubular membrane 20 compared to nitrogen molecules, resulting in a flow of OEA from the outer surface of the tubular membrane 20 as shown in FIG. 2, and a flow of NEA from the hollow core 26 at the outlet end 28 of the membrane 20 as shown in FIG. 2. The membrane 20 can be formed from different materials, including but not limited to polymers (e.g., polyimides, polysulfones, polycarbonates) including polymers of intrinsic microporosity ("PIM") (e.g., polybenzodioxanes) and thermally-rearranged ("TR") polymers (e.g., thermally-rearranged polybenzoxazoles), or refractory ceramics (e.g., zeolite).

Figure 3:
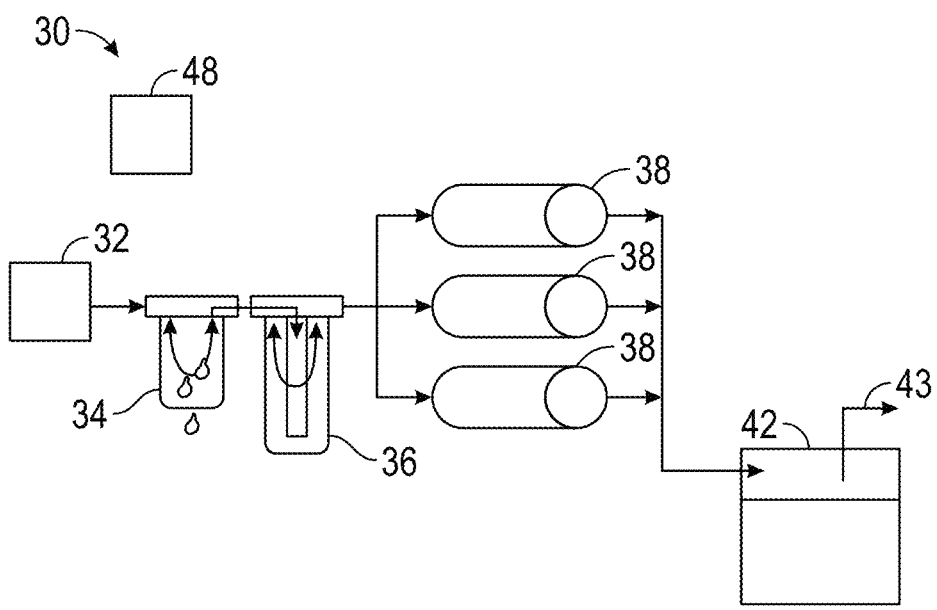
FIG. 3 is a schematic illustration of an example embodiment of an inert gas generating system.

An example embodiment of an inert gas generating system 30 is schematically shown in FIG. 3. Fluid flows between the components in FIG. 3 through the unnumbered arrowed lines that are described contextually below unless explicitly identified and numbered. As shown in FIG. 3, air from an air source 32 is directed first to an optional filter module 34. The air source 32 can be any type of air source including but not limited to a fan, blower, gas turbine engine compressor bleed, a stand-alone compressor, ram air inlet. The air source 32 can also be a simple inlet opening, with motive force provided a blower, compressor, or similar device disposed anywhere along the flow path. The optional filter module 34 can include one or more filter components, including but not limited to a particulate filter (e.g., a HEPA filter) for removal of particulates, or a coalescing filter for removal of liquid entrained in the air flow. In the case of multiple filter components, they can be integrated into a single module as shown in FIG. 3 or can be disposed in separate modules (not shown) on the air flow path. As further shown in FIG. 3, the air flow exiting from the optional filter module 34 is directed to a catalyst module 36.

The catalyst module 36 includes the adsorber, and can also include other air treatment components including but not limited to an ozone treatment catalyst or particulate filter (e.g., a HEPA filter). Alternatively, one or more such other air treatment components can be disposed in separate modules (not shown) on the air flow path. The adsorber can include an adsorbent washcoat and catalyst disposed on a substrate. In some embodiments, the substrate can be configured as a flow-through monolith having a honeycomb structure with numerous parallel thin-walled channels running axially through the substrate and extending between an inlet and an outlet of the substrate. The channel cross-section of the substrate can be any shape, but is preferably square, sinusoidal, triangular, rectangular, hexagonal, trapezoidal, circular, or oval. In some embodiments, the substrate can be configured as a wall-flow monolith. In this configuration, axial flow channels are alternately blocked, which allows the exhaust gas stream to enter a channel from the inlet, then flow through the channel walls, and exit the filter from a different channel leading to the outlet, which can allow for particulates in the air flow stream to be removed. In some embodiments, the substrate can be formed from a refractory ceramic material, including but not limited to alumina, silica, titania, ceria, zirconia, magnesia, zeolites, silicon nitride, silicon carbide, zirconium silicates, magnesium silicates, aluminosilicates, metalloaluminosilicates (e.g., cordierite or spodumene), or a mixture or mixed oxide of any two or more thereof. In some embodiments, the substrate can be formed from a metal (including metal alloys or mixtures) capable of withstanding heat resulting from operation, including but not limited to titanium, stainless steel, ferritic alloys containing iron, nickel, chromium, and/or aluminum in addition to other trace metals.

The washcoat includes a slurry of particles comprising a sorbent configured to adsorb an acid precursor, which can be applied to the substrate by a coating process such as dip coating, followed by drying and calcination. As used herein the term "acid precursor" means any compound that can form an acid when exposed to conditions or compounds that can form an acid such as a protic acid or a Lewis acid. Examples of acid precursors include nitrogen oxides (also known as "NOx") or sulfur oxides (also known as "SOx"). The sorbent typically has a porous surface that provides surface area for adsorption, and should be chemically compatible with NOx for adsorption and retention. Example sorbents include but are not limited to salts or oxides of alkali metals or alkaline earth metals, or zeolites. In some embodiments, the sorbent can physically adsorb the acid precursor, and in some embodiments, the sorbent can physicochemically adsorb acid precursors such as NOx or SOx, such as according to the following example equations:

$$BaO + 2NO_2 + \tfrac{1}{2}O_2 \rightarrow Ba(NO_3)_2 \quad (1)$$

$$K_2CO_3 + 2NO_2 + \tfrac{1}{2}O_2 \rightarrow 2KNO_3 + CO_2 \quad (2)$$

$$2KNO_3 + SO_2 \rightarrow K_2SO_4 + 2NO_2 \quad (3)$$

$$K_2CO_3 + SO_2 + \tfrac{1}{2}O_2 \rightarrow K_2SO_4 + CO_2 \quad (4)$$

In some embodiments, the adsorber can include one or more catalysts. The catalyst(s) can be applied to the sorbent before or after washcoating by various techniques including but not limited to impregnation, adsorption, or ion-exchange. In some embodiments, the catalyst can include a catalyst for oxidation of nitrogen monoxide to nitrogen dioxide that can be readily adsorbed by the sorbent. Noble metals such as platinum, palladium, rhodium, ruthenium, osmium, or iridium can be utilized to promote oxidation of nitrogen monoxide, as well as other catalysts such as multimetal oxides, perovskites, carbon-based catalysts, cobalt, or silver. In some embodiments, the catalyst can include catalyst to promote a reforming reaction that forms a reducing environment to promote removal of acid precursor from the sorbent. Many of the above-mentioned noble metals catalysts can promote the reforming reaction, and in some embodiments, a catalyst or catalyst composition can be utilized that is capable of performing both functions. In some embodiments, however, the system can include separate catalysts or catalyst compositions for the oxidation and reforming functions. For example, a palladium catalyst can be utilized to promote oxidation of nitrogen monoxide, and a rhodium catalyst can be utilized to promote reforming of a fuel. For embodiments in which separate catalysts or catalyst compositions are utilized, the reforming catalyst can be integrated into the adsorber upstream of the sorbent or can be in a separate catalyst module disposed between a fuel source and the adsorber as described below in further detail. Other catalytic functions can also be performed.

The adsorber can be configured and operated as an active adsorber or a passive adsorber. An active adsorber can be regenerated by passing a reducing gas stream (e.g., a hydrogen-rich gas stream such as can be formed by reforming a hydrocarbon fuel) in operative fluid communication with the sorbent, whereas a passive adsorber can be regenerated by passing a gas stream in operative fluid communication with the sorbent without the need for a reducing environment. With continuing reference to FIG. 3, regeneration of the sorbent in the catalyst module 36 can be carried out with a regeneration fluid stream delivered through flow path 46 as described below.

During normal operation of the system, the adsorber operates in an adsorption mode as acid precursor in the air flow from the air source 32 is adsorbed by the sorbent in catalyst module 36, and treated air exiting the adsorber is directed to an air separation module (ASM) 38 (a bank of three ASM's is shown in FIG. 3). Oxygen is preferentially transported through the membranes of the ASM 38 and nitrogen-enriched air (NEA) exits outlets from the ASM 38. The NEA is directed to a protected space in the form of a fuel tank 42 (e.g., a center fuel tank of an aircraft) equipped with a vent 43.

Figure 4:
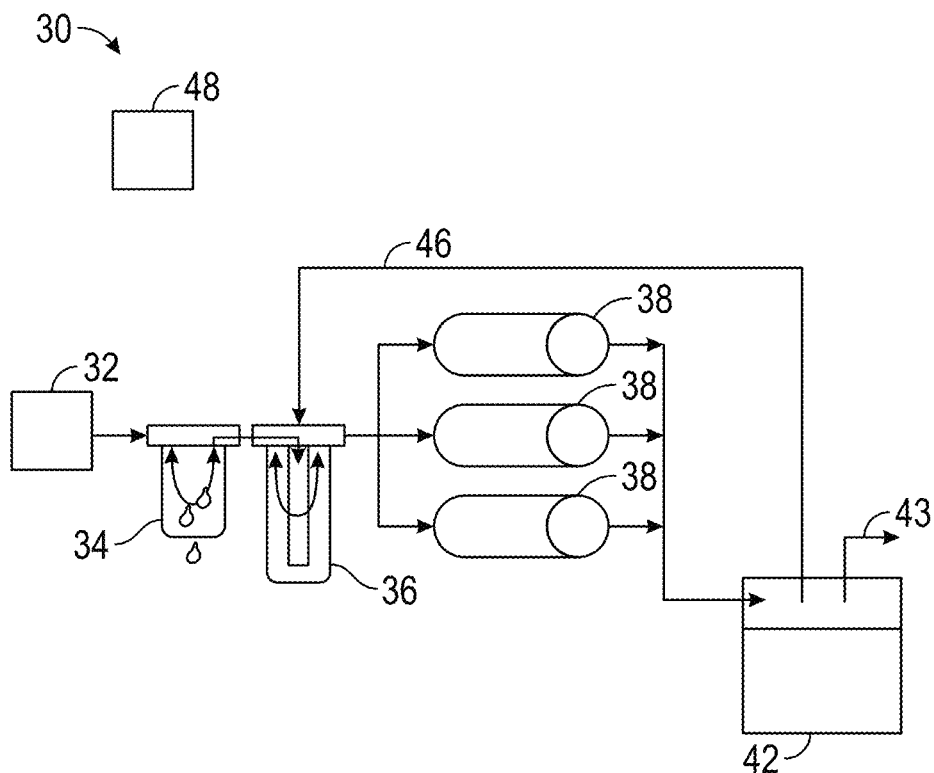
FIG. 4 is a schematic illustration of an example embodiment of an inert gas generating system configured for regeneration of an adsorber.
Figure 5:
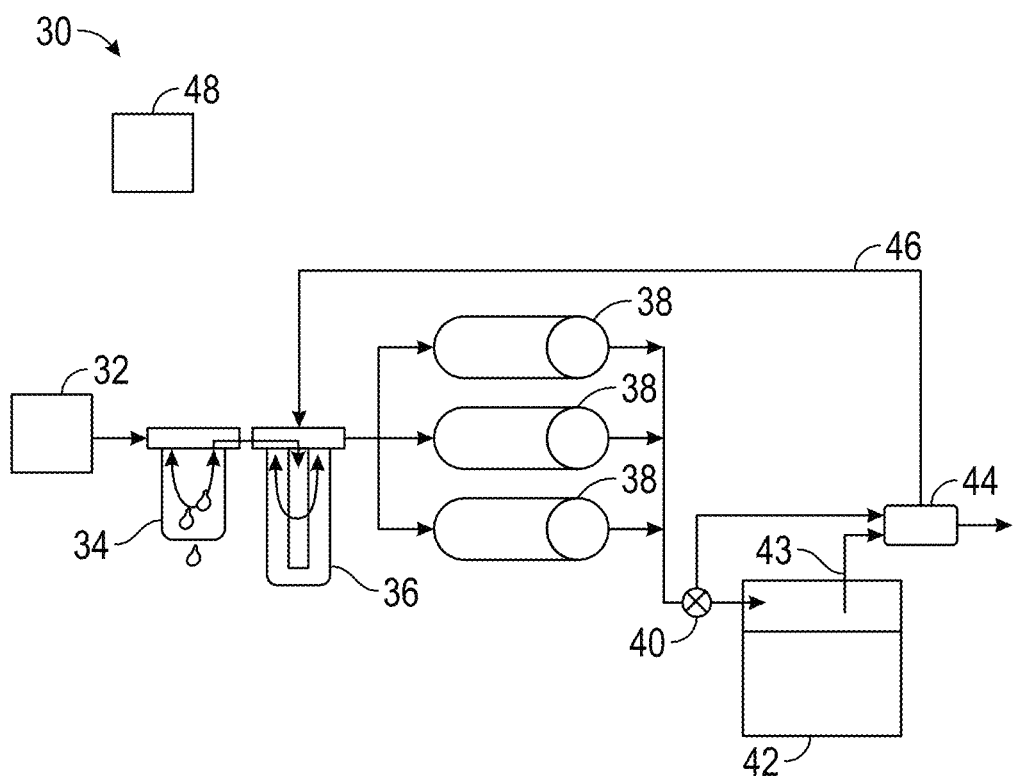
FIG. 5 is a schematic illustration of another example embodiment of an inert gas generating system configured for regeneration of an adsorber.

As mentioned above, regeneration of the NOx sorbent can be active or passive. In the passive mode, the fuel vapors can be catalytically oxidized, using the same catalyst that promotes oxidation of nitrogen monoxide or a different oxidation catalyst to form a heated combustion gas for passive regeneration of the NOx sorbent. In some aspects, regeneration can be carried out with external regeneration components (e.g., as a maintenance operation) or remotely (e.g., by swapping out the catalyst module 36 for a fresh module). For example, an aircraft-based system adsorber may only need to be operated during taxi operations where the aircraft can be exposed to acid precursors in the exhaust of other aircraft, and therefore may have sufficient capacity for that duration so that it may not need regeneration during operation. In other aspects, however, regeneration may be required during system operation, in which case the system can include regeneration components such as shown in FIG. 4 or FIG. 5. FIGS. 4 and 5 each include a flow path 46 that directs fuel vapor from the fuel tank 42 to the catalyst module 36 for regeneration of the adsorber. Regenerative flow of fuel vapor along the flow path of FIG. 4 can be activated by operation of a valve or blower (not shown) integrated with the flow path 46. In some aspects, an oxidation catalyst for catalytic oxidation of the fuel can be disposed in the catalyst module 36 or in a separate module (not shown) along the flow path 46. For active regeneration, a reforming catalyst can also be disposed in the catalyst module 36 or in a separate module (not shown) along the flow path 46 to promote a reforming reaction in which hydrocarbon fuel molecules undergo a reforming reaction in which the hydrocarbon is converted to hydrogen and carbon dioxide. The presence of hydrogen can provide a reducing environment that promotes reduction of the stored acid precursors such as NOx stored in the sorbent to form inert nitrogen. Some acid precursors may require additional intervention to regenerate the adsorber. For example, SOx accumulation in the adsorber may require desulfation such as described in U.S. Pat. No. 7,036,489, the disclosure of which is incorporated herein by reference in its entirety.

FIG. 5 schematically shows additional components for capture of fuel vapor for use in regeneration of the adsorber. As shown in FIG. 5, during a regeneration mode of operation, the valve 40 is set to divert part or all of the NEA flow (which is typically at an elevated temperature, e.g., about 185° F.) to a fuel vapor sorbent 44 that is shown disposed in a vent line in operative communication with a vapor space of the fuel tank 42 to receive fuel vapor therefrom. The fuel vapor sorbent 44 can include various materials capable of storing fuel or fuel vapors therein, including but not limited to activated carbon. Fuel vapor recovered from the fuel vapor sorbent 44 is directed through the flow path 46 back to the catalyst module 36 for regeneration of the NOx sorbent.

Acid precursors such as NOx and SOx can be present in the environment, and the systems described herein can be operated in an adsorption mode at any time for removal of acid precursors from air bound for an air separation module. Acid precursors such as NOx and/or SOx can also be formed from combustion of fuel, with NOx resulting from oxidation of atmospheric nitrogen during combustion and SOx resulting from oxidation of sulfur that may be present in a fuel such as jet fuel or diesel fuel. Although bleed air that is often used to supply the air separation module is drawn from a compressor section of a gas turbine engine that is upstream of the engine's combustor section, aircraft on the ground (e.g., at an airport) can be exposed to engine exhaust from other aircraft, which can contain NOx and/or SOx. Accordingly, in some embodiments, the system employed on an aircraft can be operated in an adsorption mode during aircraft operation on the ground, and can be operated in a sorbent regeneration mode during flight or at a time when the aircraft is on the ground other than during active aircraft operation (e.g., during maintenance).

As further shown in FIGS. 3-5, the system 30 can include a controller 48. The controller 48 can be in operative communication with the catalyst module 36, the air separation module 38, the valve 40, the fuel tank 42, the fuel vapor sorbent 44, and any associated valves, pumps, compressors, conduits, pressure regulators, or other fluid flow components, and with switches, sensors, and other electrical system components, and any other system components to operate the inerting gas system. These control connections can be through wired electrical signal connections (not shown) or through wireless connections. In some embodiments, the controller 48 can be configured to operate the system according to specified parameters, as discussed in greater detail further above. The controller can be an independent controller dedicated to controlling the inert gas generating system 30, or can interact with other onboard system controllers or with a master controller. In some embodiments, data provided by or to the controller 48 can come directly from a master controller.

In some embodiments, the inert gas systems described herein can provide a technical effect of promoting resistance to potential degradation of the membranes used in air separation modules. Acid precursors such as NOx and SOx can combine with water (e.g., ambient moisture) to form acids such as nitric acid or sulfuric acid, which can in turn promote a hydrolysis reaction involving the air separation module membrane that can degrade the structure of the membrane. Additionally, in some embodiments, the absorption (e.g., by fuel vapor sorbent 44) or other diversion of fuel vapors for regeneration of the adsorber can provide a technical effect of promoting reduction of fuel vapor emissions to the atmosphere.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an", "the", or "any" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for providing inerting gas to a protected space, comprising:
    an air separation module comprising an air inlet, a membrane with a permeability differential between oxygen and nitrogen, a nitrogen-enriched air outlet, and an oxygen-enriched air outlet;
    an air flow path between an air source and the air separation module air inlet;
    an inerting gas flow path between the air separation module nitrogen-enriched air outlet and the protected space;
    an adsorber configured to adsorb an acid precursor in operative fluid communication with the air flow path; and
    a regenerative fluid flow path in operative fluid communication between a fuel source and the adsorber.

2. The system of claim 1, wherein the air separation module membrane comprises an organic polymer membrane.

3. The system of claim 2, wherein the polymer membrane comprises a polyimide, a polysulfone, or a polycarbonate.

4. The system of claim 1, wherein the adsorber comprises a sorbent selected from salts or oxides of alkaline metals; or salts or oxides of alkaline earth metals.

5. The system of claim 1, wherein the acid precursor comprises NOx or SOx.

6. The system of claim 1, wherein the acid precursor comprises NOx.

7. The system of claim 6, wherein the adsorber comprises a catalyst configured to oxidize nitrogen monoxide during sorption.

8. The system of claim 7, wherein the catalyst includes an oxidation catalyst and a reforming catalyst.

9. The system of claim 1, wherein the adsorber includes a catalyst configured to oxidize fuel, or a catalyst to reform fuel, or a catalyst to oxidize fuel and a catalyst to reform fuel from the regenerative fluid flow path during regeneration of the adsorber.

10. The system of claim 1, wherein the regenerative fluid flow path includes a flow path from the air separation module nitrogen-enriched air outlet, through the fuel source, to the adsorber.

11. The system of claim 1, wherein the fuel source includes a fuel vapor sorbent in operative fluid communication with a fuel tank.

12. The system of claim 1, further comprising a controller configured to operate the system in alternate modes of operation including a first mode in which the acid precursor is accumulated in a sorbent in the adsorber, and a second mode in which the accumulated acid precursor is removed from the adsorber.

13. The system of claim 1, wherein the system is disposed on-board an aircraft.

14. A method of producing inert gas, comprising
   directing air through an adsorber configured to adsorb an acid precursor to produce treated air;
   directing the treated air through a membrane with a permeability differential between oxygen and nitrogen to produce inert gas comprising nitrogen-enriched air; and
   regenerating the adsorber by desorbing the acid precursor from the adsorber, wherein regenerating includes directing a fuel to the adsorber during the regeneration, and (i) oxidizing the fuel; (ii) reforming the fuel; or (iii) oxidizing and reforming the fuel during the regeneration.

15. The method of claim 14, wherein the acid precursor includes NOx, and the method further comprises oxidizing nitrogen monoxide in the adsorber to facilitate adsorption.

16. The method of claim 14, comprising removing fuel vapor from a fuel tank vent line with a fuel sorbent, and directing fuel vapor from the fuel sorbent to the adsorber during the regeneration.

* * * * *